US012614280B2

(12) United States Patent
Zangwill et al.

(10) Patent No.: US 12,614,280 B2
(45) Date of Patent: Apr. 28, 2026

(54) SYSTEM FOR ESTIMATING PRIMARY OPEN-ANGLE GLAUCOMA LIKELIHOOD

(71) Applicant: The Regents of the University of California, Oakland, CA (US)

(72) Inventors: Linda Zangwill, San Diego, CA (US); Mark Christopher, San Diego, CA (US); Christopher Bowd, San Diego, CA (US); Akram Belghith, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 688 days.

(21) Appl. No.: 17/289,673

(22) PCT Filed: Oct. 30, 2019

(86) PCT No.: PCT/US2019/058948
§ 371 (c)(1),
(2) Date: Apr. 28, 2021

(87) PCT Pub. No.: WO2020/092634
PCT Pub. Date: May 7, 2020

(65) Prior Publication Data
US 2021/0407096 A1     Dec. 30, 2021

Related U.S. Application Data

(60) Provisional application No. 62/752,924, filed on Oct. 30, 2018.

(51) Int. Cl.
G06T 7/11 (2017.01)
G06T 3/20 (2006.01)
(Continued)

(52) U.S. Cl.
CPC .................. G06T 7/11 (2017.01); G06T 3/20 (2013.01); G06T 3/40 (2013.01); G06T 3/60 (2013.01);
(Continued)

(58) Field of Classification Search
CPC ... G06T 7/001; G06T 7/11; G06T 7/12; G06T 3/20; G06T 3/40; G06T 3/60;
(Continued)

(56) References Cited

U.S. PATENT DOCUMENTS 8,879,813 B1 * 11/2014 Solanki .................. G16H 50/20
                                                382/128
10,722,180 B2 * 7/2020 Zhang .................... G06N 3/084
(Continued)

FOREIGN PATENT DOCUMENTS

WO   WO-2011018193 A2 *  2/2011   ......... G06F 19/3443
WO   WO-2011059409 A1    5/2011
(Continued)

OTHER PUBLICATIONS

S. Gheisari, A combined convolutional and recurrent neural network for enhanced glaucoma detection, Scientific Reports, (Year: 2021).*
(Continued)

*Primary Examiner* — Stephen S Hong
*Assistant Examiner* — Carl E Barnes, Jr.
(74) *Attorney, Agent, or Firm* — FisherBroyles, LLP

(57)     ABSTRACT

This application describes a system to estimate the likelihood of glaucoma from fundus images. The system may include receiving an optic nerve head region of an original image. A variation to the optic nerve head region are applied. A first primary open angle glaucoma likelihood estimate based on the first varied optic nerve head region is generated using a trained convolutional neural network. A second primary open angle glaucoma likelihood estimate based on
(Continued)

the second varied optic nerve head region is generated using a trained convolutional neural network. The first primary open angle glaucoma likelihood estimate and the second primary open angle glaucoma likelihood estimate are combined into a final primary open angle glaucoma likelihood estimate. The final primary open angle glaucoma likelihood estimate is presented to a user.

18 Claims, 9 Drawing Sheets

(51) Int. Cl.

| | |
|---|---|
| *G06T 3/40* | (2024.01) |
| *G06T 3/60* | (2024.01) |
| *G06T 7/00* | (2017.01) |
| *G06T 11/00* | (2006.01) |

(52) U.S. Cl.
CPC .......... *G06T 7/0012* (2013.01); *G06T 11/001* (2013.01); *G06T 2207/20081* (2013.01); *G06T 2207/20084* (2013.01); *G06T 2207/30041* (2013.01)

(58) Field of Classification Search
CPC ......... G06T 11/001; G06T 2207/20081; G06T 2207/20084; G06T 2207/30041; G06T 7/0012
See application file for complete search history.

(56) References Cited

U.S. PATENT DOCUMENTS

| | | | | |
|---|---|---|---|---|
| 2008/0100612 | A1* | 5/2008 | Dastmalchi | A61B 3/102 345/418 |
| 2012/0230564 | A1* | 9/2012 | Liu | A61B 3/0025 382/128 |
| 2017/0357879 | A1* | 12/2017 | Odaibo | G06N 20/00 |
| 2018/0140180 | A1* | 5/2018 | Coleman | G06T 7/0012 |
| 2019/0059719 | A1* | 2/2019 | Wang | G06V 10/82 |
| 2019/0220973 | A1* | 7/2019 | Cho | G06T 7/136 |

FOREIGN PATENT DOCUMENTS

| | | |
|---|---|---|
| WO | WO-2017101036 A1 | 6/2017 |
| WO | WO-2018045363 A1 | 3/2018 |
| WO | WO-2018143180 A1 | 8/2018 |

OTHER PUBLICATIONS

R. Chrastek Automated segmentation of the optic nerve head for diagnosis of glaucoma, Medical Image Analysis (Year: 2005).*
Ruben Hemelings, Deep learning on fundus images detects glaucoma beyond the optic disc (Year: 2021).*
Goldbaum, M., Performance of Deep Learning Architectures and Transfer Learning for Detecting Glaucomatous Optic Neuropathy in Fundus Photographs (Year: 2018).*
Wigdahl, Shortest path approach to optic disc detection in retinal fundus images (Year: 2016).*
Quigley, H. et al., "The number of people with glaucoma worldwide in 2010 and 2020." British Journal of Ophthalmology 90, 262-267 (2006).
Tham, Y. C. et al. "Global Prevalence of Glaucoma and Projections of Glaucoma Burden through 2040: A Systematic Review and Meta-Analysis." Ophthalmology 121, 2081-2090 500 (2014).
Schwartz, J. T., et al., "Size of the Physiologic Cup of the Optic Nerve Head: Hereditary and Environmental Factors." Arch. Ophthalmol. 93, 776-780 503 (1975).
Leske, M. C., et al., "The Barbados Eye Study." Arch. Ophthalmol. 112, 821 (1994).

Chua, J. et al., "Prevalence, Risk Factors, and Visual Features of Undiagnosed Glaucoma: The Singapore Epidemiology of Eye Diseases Study." JAMA Ophthalmol. 133, 938-946 (2015).
Miller, S. E et al., "Glaucoma Screening in Nepal: Cup-to-Disc Estimate With Standard Mydriatic Fundus Camera Compared to Portable Nonmydriatic Camera." Am. J. Ophthalmol. 182, 99-106 (2017).
Burr, J. M. et al. "The clinical effectiveness and cost-effectiveness of screening for open angle glaucoma: a systematic review and economic evaluation." Health Technol. Assess. 11, iii-iv, ix-x, 1-190 (2007).
Moyer, Virginia A. and U.S. Preventive Services Task Force. "Screening for Glaucoma: U.S. Preventive Services Task Force Recommendation Statement." Ann. Intern. Med. 159, 484-489 (2013).
Jampel, H. D. et al., "Agreement Among Glaucoma Specialists in Assessing Progressive Disc Changes From Photographs in Open-Angle Glaucoma Patients." Am. J. Ophthalmol. 147, (2009).
Gaasterland, D. E. et al. "The Advanced Glaucoma Intervention Study (AGIS): 10. Variability Among Academic Glaucoma Subspecialists in Assessing Optic Disc Notching." Trans. Am. Ophthalmol. Soc. 99, 177-84; discussion 184-5 (2001).
Lichter, P. R., "Variability of Expert Observers in Evaluating the Optic Disc." Trans. Am. Ophthalmol. Soc. 74, 532-572 (1976).
Stark, Angela, "FDA permits marketing of artificial intelligence-based device to detect certain 527 diabetes-related eye problems."(2018). ttps://www.fda.gov/NewsEvents/Newsroom/PressAnnouncements/ucm604357.htm.
Shen, D. et al., "Deep Learning in Medical Image Analysis." Annu. Rev. Biomed. Eng. 19, 221-248 (2017).
Lee, C. S. et al., "Deep Learning Is Effective for Classifying Normal versus Age-Related Macular Degeneration Optical Coherence Tomography Images." Ophthalmol. Retin. (2017).
Asaoka, R. et al., "Detecting Preperimetric Glaucoma with Standard Automated Perimetry Using a Deep Learning Classifier." Ophthalmology 123, 1974-1980 (2016).
Abramoff, M.D., et al., "Improved Automated Detection of Diabetic Retinopathy on a Publicly Available Dataset through Integration of Deep Learning Improved Automated Detection of Diabetic Retinopathy on a Publicly Available. Invest." Ophthalmol. Vis. Sci. (2016). doi:10.1167/iovs.16-19964.
Gulshan, V. et al. "Development and Validation of a Deep Learning Algorithm for Detection of Diabetic Retinopathy in Retinal Fundus Photographs." JAMA 316, 2402 (2016).
Kermany, D. S. et al., "Identifying Medical Diagnoses and Treatable Diseases by Image-Based Deep Learning." Cell 172, 1122-1131.e9 (2018).
Devalla, S. K. et al., "A Deep Learning Approach to Digitally Stain Optical Coherence Tomography Images of the Optic Nerve Head." Invest. Ophthalmol. Vis. Sci. 59, 63-74 (2018).
Abramoff, M., "Retinal Imaging and Image Analysis." Eng. IEEE Rev. 1, 169-208 (2010).
Yousefi, S. et al. "Learning from Data: Recognizing Glaucomatous Defect Patterns and Detecting Progression from Visual Field Measurements." IEEE Trans. Biomed. Eng. 61, 2112-2124 (2014).
Chaudhuri, S., "Detection of Blood Vessels in Retinal Images Using Two-Dimensional Matched Filters." IEEE Trans. Med. Imaging 8, 263-269 (1989).
Goldbaum, M. et al., "Automated Diagnosis and Image Understanding with Object Extraction, Object Classification, and Inferencing in Retinal Images." Proc. IEEE Int. Conf. Image Process. 3, 695-698 (1996).
LeCun, Y. et al., "Deep learning." Nature 521, 436-444 (2015).
Baker, B. et al., "Designing Neural Network Architectures Using Reinforcement Learning." Proc. 5th Int. Conf. Learn. Represent. 1-18 (2017).
Weiss, K. et al., "A survey of transfer learning." J. Big Data 3, (2016).
Muhammad, H. et al., Hybrid deep learning on single wide-field optical coherence tomography scans accurately classifies glaucoma suspects. J. Glaucoma 26, 1086-1094 (2017).
Sample, P. A. et al., "The African Descent and Glaucoma Evaluation Study (ADAGES): Design and Baseline Data." Arch. Ophthalmol. (Chicago, III. 1960) 127, 1136-45 (2009).

(56) References Cited

OTHER PUBLICATIONS

Racette, L. et al., "African Descent and Glaucoma Evaluation Study (ADAGES): III. Ancestry Differences in Visual Function in Healthy Eyes." Arch. Ophthalmol. (Chicago, III. 1960) 128, 551-9 (2010).

Wang, J. et al., "The Effectiveness of Data Augmentation in Image Classification using Deep Learning." Convolutional Neural Networks Vis. Recognit. (2017).

Simonyan, K. et al., "Very Deep Convolutional Networks for Large-Scale Image Recognition." Int. Conf. Learn. Represent. 1-14 (2015).

Szegedy, C. et al., "Going Deeper with Convolutions." In Proceedings of the IEEE Computer Society Conference on Computer Vision and Pattern Recognition Jun. 7-12, 1-9, (2015).

Szegedy, C. et al., "Inception-v4, Inception-ResNet and the Impact of Residual Connections on Learning." Proceedings of the 31st AAAI Conference on Artificial Intelligence (AAAI-17), 4278-84 (2016).

Litjens, G. et al., "A Survey on Deep Learning in Medical Image Analysis." Medical Image Analysis 42, 60-88 (2017).

Glorot, X. et al., "Understanding the difficulty of training deep feedforward neural networks." PMLR 9, 249-256 (2010).

Russakovsky, O. et al., "ImageNet Large Scale Visual Recognition Challenge." Int. J. Comput. Vis. 115, 211-252 (2015).

Jia, Y. et al., "Caffe: Convolutional Architecture for Fast Feature Embedding." ACM Int. Conf. Multimed. 675-678 (2014).

Obuchowski, N.A., "Nonparametric Analysis of Clustered ROC Curve Data." Biometrics (1997). doi:10.2307/2533958.

R Development Core Team (2011) R: A language and environment for statistical computing. R Foundation for Statistical Computing, Vienna. http://www.R-project.org.

Robin, X. et al., "pROC: An open-source package for R and S+ to analyze and compare ROC curves." BMC Bioinformatics (2011).

Grau, J. et al., "PRROC: Computing and visualizing Precision-recall and receiver operating characteristic curves in R." Bioinformatics (2015), 2595-2597.

Zeiler, M. D. et al., "Visualizing and Understanding Convolutional Networks." European Conference on Computer Vision, Part 1, LNCS 8689 LNCS, 818-833 (2014).

Chakrabarty, L. et al., "Automated Detection of Glaucoma from Topographic Features of the Optic Nerve Head in Color Fundus Photographs." J. Glaucoma 25, 590-597 (2016).

Li, A. et al., "Integrating Holistic and Local Deep Features for Glaucoma Classification." In Proceedings of the Annual International Conference of the IEEE Engineering in Medicine and Biology Society, EMBS Oct. 2016, 1328-1331 (2016).

Chen, Xiangyu et al., "Glaucoma detection based on deep convolutional neural network." In 2015 37th Annual International Conference of the IEEE Engineering in Medicine and Biology Society (EMBC) 715-718 (2015). doi:10.1109/EMBC.2015.7318462.

Tielsch, J. M. et al., "A Population-based Evaluation of Glaucoma Screening: The Baltimore Eye Survey." Am. J. Epidemiol. 134, 1102-1110 (1991).

Ervin AM Et al., "Screening for Glaucoma: Comparative Effectiveness." Comp. Eff. Review 59, 1-20 (2012).

Jonas, J. B. et al., "Ophthalmoscopic Evaluation of the Optic Nerve Head." Survey of Ophthalmology 43, 293-320 (1999).

Li, Z. et al., "Efficacy of a Deep Learning System for Detecting Glaucomatous Optic Neuropathy Based on Color Fundus Photographs." Ophthalmology (2018).

Zangwill L.M. et al., "Racial Differences in Optic Disc Topography: Baseline Results from the Confocal Scanning Laser Ophthalmoscopyancillary Study to the Ocular Hypertension Treatment Study." Arch. Ophthalmol. 122, 22-28 (2004).

He, K., "Deep Residual Learning for Image Recognition." In 2016 IEEE Conference on Computer Vision and Pattern Recognition (CVPR) (2016).

Abrams, L. S. et al., "Agreement Among Optometrists, Ophthalmologists, and Residents in Evaluating the Optic Disc for Glaucoma." Ophthalmology (1994). doi:10.1016/50161-6420(94)31118-3.

Varma, R. et al., "Expert Agreement in Evaluating the Optic Disc for Glaucoma." Ophthalmology (1992). doi:10.1016/S0161-6420(92)31990-6.

Zbontar, J. et al., "Computing the Stereo Matching Cost with a Convolutional Neural Network." In Proceedings of the IEEE Computer Society Conference on Computer Vision and Pattern Recognition Jun. 7-12, 1592-1599 (2015).

Donahue, J. et al., "Long-Term Recurrent Convolutional Networks for Visual Recognition and Description." IEEE Trans. Pattern Anal. Mach. Intel'. 39, 677-691 (2017).

* cited by examiner

600

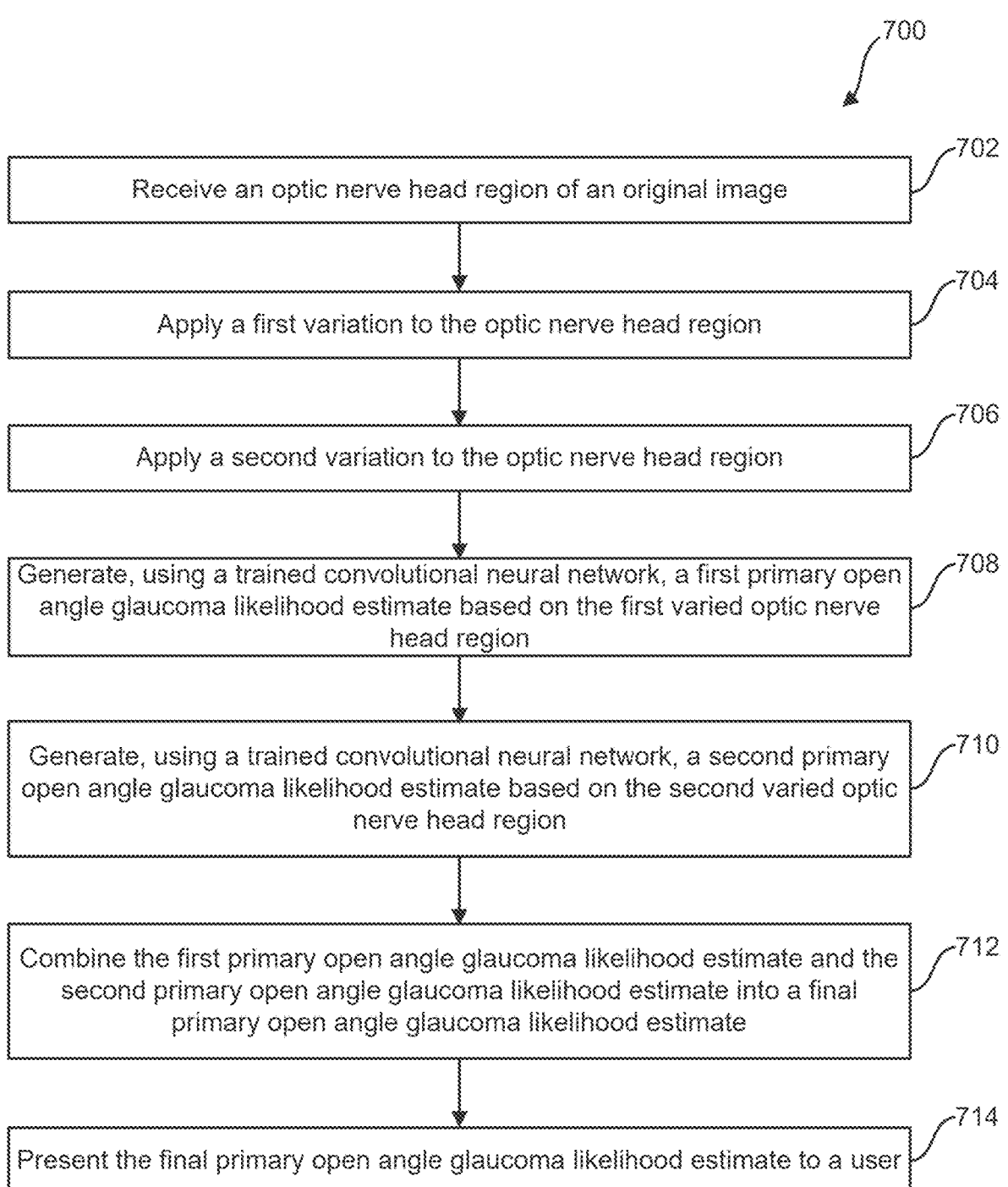

700

702
Receive an optic nerve head region of an original image

704
Apply a first variation to the optic nerve head region

706
Apply a second variation to the optic nerve head region

708
Generate, using a trained convolutional neural network, a first primary open angle glaucoma likelihood estimate based on the first varied optic nerve head region 710
Generate, using a trained convolutional neural network, a second primary open angle glaucoma likelihood estimate based on the second varied optic nerve head region 712
Combine the first primary open angle glaucoma likelihood estimate and the second primary open angle glaucoma likelihood estimate into a final primary open angle glaucoma likelihood estimate 714
Present the final primary open angle glaucoma likelihood estimate to a user

FIG. 7

SYSTEM FOR ESTIMATING PRIMARY OPEN-ANGLE GLAUCOMA LIKELIHOOD

This application is a national stage entry of Patent Cooperation Treaty Application No. PCT/US19/58948 filed Oct. 30, 2019, entitled "SYSTEM FOR ESTIMATING PRIMARY OPEN-ANGLE GLAUCOMA LIKELIHOOD," which claims priority to U.S. Provisional Application No. 62/752,924 filed on Oct. 30, 2018, entitled "SYSTEM FOR ESTIMATING PRIMARY OPEN-ANGLE GLAUCOMA LIKELIHOOD," the disclosures of which are incorporated herein by reference in their entirety.

FIELD

The subject matter disclosed herein relates to identifying primary open-angle glaucoma in fundus images for screening, diagnostic, and monitoring purposes.

BACKGROUND

Glaucoma affects nearly 80 million people worldwide and is one of the most common causes of irreversible blindness. It is characterized by progressive structural and functional damage to the optic nerve head that can eventually lead to functional impairment, disability, and blindness. Despite screening and treatment efforts, roughly 50% of people suffering from primary open-angle glaucoma are currently undiagnosed. To help identify the millions of people currently living with undiagnosed primary open-angle glaucoma, effective screening programs are needed. However, the U.S. Preventive Services Task Force does not recommend large-scale adoption of any current primary open-angle glaucoma screening programs due to insufficient evidence that the benefits of screening outweigh the costs and potential harm. This is due, in part, to the relatively low sensitivity and specificity of current primary open-angle glaucoma screening tests. There is therefore a demonstrable need for reliable and efficient techniques for identifying primary open-angle glaucoma.

SUMMARY

Methods, systems, and articles of manufacture, including computer program products, are provided for estimating primary open-angle glaucoma likelihood. In one aspect, there is provided a system. The system may include at least one data processor and at least one memory. The at least one memory may store instructions that result in operations when executed by the at least one data processor. The operations may include: receiving an optic nerve head region of an original image, applying a first variation to the optic nerve head region, applying a second variation to the optic nerve head region, generating, using a trained convolutional neural network, a first primary open angle glaucoma likelihood estimate based on the first varied optic nerve head region, generating, using the trained convolutional neural network, a second primary open angle glaucoma likelihood estimate based on the second varied optic nerve head region, combining, into a final primary open angle glaucoma likelihood estimate, the first primary open angle glaucoma likelihood estimate and the second primary open angle glaucoma likelihood estimate; and presenting the final primary open angle glaucoma likelihood estimate to a user.

In some variations, one or more of the features disclosed herein including the following features can optionally be included in any feasible combination. The original image may be a fundus image and the optic nerve head region may be centered on an optic nerve head.

In some variations, the operations may further include identifying the optic nerve head region of the original image and extracting the optic nerve head region.

In some variations, the optic nerve head region has the shape of a square.

In some variations, the operations may further include verifying the original image meets a quality standard.

In some variations, the trained convolutional neural network may be trained using a database of known primary open angle glaucoma diagnosis fundus images and healthy fundus images.

In some variations, the first variation and the second variation may include performing at least one of a horizontal translation, a vertical translation, a horizontal scaling, a vertical scaling, a rotation, a color adjustment, a mirroring, a nonlinear geometric transformation, multiplicative noise applied to pixel values of the optic nerve head region, and an additive noise applied to pixel values of the optic nerve head region.

In some variations, a set of parameters controlling variations may be chosen using a random procedure.

In some variations, the combining, into a final primary open angle glaucoma likelihood estimate, the first primary open angle glaucoma likelihood estimate and the second primary open angle glaucoma likelihood estimate further comprises utilizing at least one of a mean, a median, a minimum, a maximum, and a linear combination.

In another aspect, a method is provided for estimating primary open angle glaucoma likelihood. The method may include receiving an optic nerve head region of an original image, applying a first variation to the optic nerve head region, applying a second variation to the optic nerve head region, generating, using a trained convolutional neural network, a first primary open angle glaucoma likelihood estimate based on the first varied optic nerve head region, generating, using the trained convolutional neural network, a second primary open angle glaucoma likelihood estimate based on the second varied optic nerve head region, combining, into a final primary open angle glaucoma likelihood estimate, the first primary open angle glaucoma likelihood estimate and the second primary open angle glaucoma likelihood estimate; and presenting the final primary open angle glaucoma likelihood estimate to a user.

In another aspect, there is provided a computer program product that includes a non-transitory computer readable storage medium. The non-transitory computer-readable storage medium may include receiving an optic nerve head region of an original image, applying a first variation to the optic nerve head region, applying a second variation to the optic nerve head region, generating, using a trained convolutional neural network, a first primary open angle glaucoma likelihood estimate based on the first varied optic nerve head region, generating, using the trained convolutional neural network, a second primary open angle glaucoma likelihood estimate based on the second varied optic nerve head region, combining, into a final primary open angle glaucoma likelihood estimate, the first primary open angle glaucoma likelihood estimate and the second primary open angle glaucoma likelihood estimate; and presenting the final primary open angle glaucoma likelihood estimate to a user.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to training a machine learning model for natural language processing, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 depicts a flowchart illustrating a process for estimating primary open-angle glaucoma likelihood from fundus images, in accordance with some example embodiments;

When practical, similar reference numbers denote similar structures, features, or elements.

DETAILED DESCRIPTION

Traditionally, optic nerve head examination using ophthalmoscopy and fundus photography has been used to diagnose and monitor primary open-angle glaucoma. These examination methods are subjective, qualitative, and require significant clinical training. Even with extensive training, traditional methods are unreliable due to subjectivity. Furthermore, large-scale screening programs are expensive, time-consuming, and highly dependent on the subjective conditions. Thus, reliable and efficient systems and methods for identifying primary open-angle glaucoma in fundus images are needed.

The development of deep learning approaches has advanced the state-of-the-art in image classification, segmentation, and object detection. Classifying medical images using traditional machine learning techniques typically requires clinical experts to explicitly define features of interest for a specific task. Deep learning models such as convolutional neural networks can learn features that maximize their ability to perform a given task such as distinguishing between images of healthy and diseased patients. Deep learning models have outperformed more traditional approaches in many medical and ophthalmic image analysis tasks without the need to use domain-specific knowledge to explicitly define informative features.

Disclosed herein are systems and methods for estimating primary open-angle glaucoma likelihood from fundus images of the optic nerve head. The disclosed includes receiving an optic nerve head region of an original image, applying a variation to the optic nerve head region, applying deep learning models—such as convolutional neural networks—to produce estimates of disease probability, and combining estimates to present a quantitative estimate the likelihood of primary open-angle glaucoma.

Figure 1:
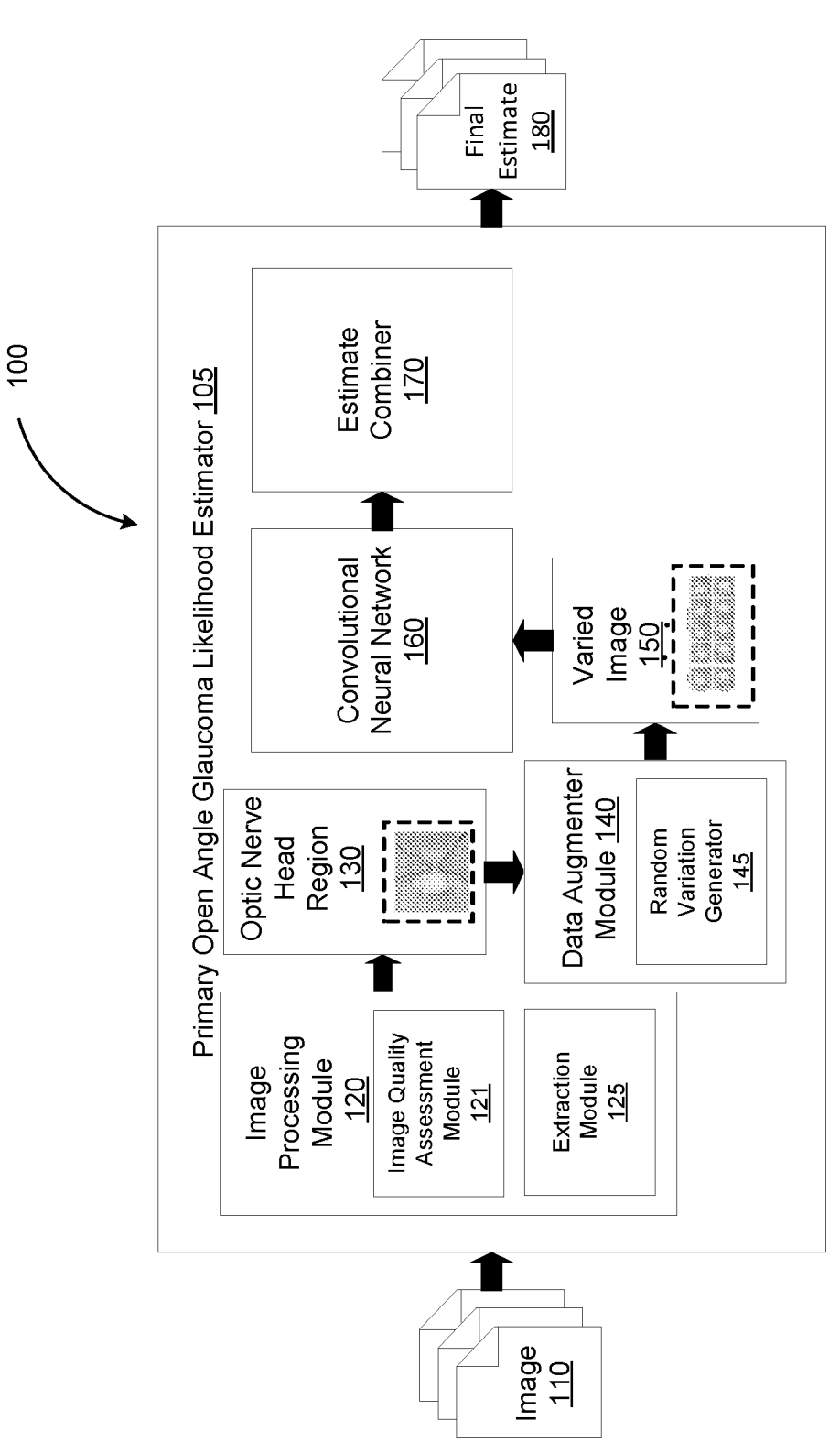
FIG. 1 shows a block diagram for estimating primary open-angle glaucoma likelihood, in accordance with some example embodiments.

FIG. 1 shows a block diagram for estimating primary open-angle glaucoma likelihood, in accordance with some example embodiments. The block diagram 100 includes a primary open-angle glaucoma likelihood estimator 105. The primary open-angle glaucoma likelihood estimator includes an image processing module 120, a data augmenter module 140, a convolutional neural network 160, and an estimate combiner 170. The image processing module 120 may include an image quality assessment module 121 and an extraction module 125. The image processing module 120 is configured to produce an optic nerve head region 130. The image processing module 120 may be communicatively coupled to the data augmenter module 140. The data augmenter module 140 may include a random variation generator 145. The data augmenter module 140 is configured to output a varied image 150. The data augmenter module 140 may be communicatively coupled to the convolutional neural network 160. The convolutional neural network 160 is configured to produce a primary open-angle glaucoma likelihood estimate. The trained convolutional neural network 160 is communicatively coupled to the estimate combiner 170. The estimate combiner 170 is configured to produce a final estimate 180. The block diagram 100 may accept image 110 as an input as produce a final estimate 180 as an output.

Image 110 may be a fundus image. The fundus image may be provided by a camera communicatively coupled to the primary open-angle glaucoma likelihood estimator 105. Optionally, the fundus image may be received from a server, an external drive, a database, or any other computing device.

The fundus image contains a region with an optic nerve head. The fundus image is of sufficient quality that the optic nerve head region 130 can be clearly observed. Image 110 may be a previously cropped photo of a larger image, the image 110 only including the optic nerve head region 130.

Image processing module 120 verifies that image 110 meets quality standards and identifies the optic nerve head region 130 in the image 110. The optic nerve head region 130 may be defined as a square region of the image 110 centered on the optic nerve head. The optic nerve head region 130 may have a width and a height roughly equal to twice the optic nerve head diameter. The optic nerve head region 130 may have the shape of a square. The optic nerve head region 130 may be extracted by a third-party system or the image processing module 120.

The image quality assessment module 121 verifies image 110 meets quality standards. The image quality assessment module may check the resolution, clarity, focus, pixilation, color scheme, or size of image 110 to verify the image 110 meets quality standards. The image 110 must be of sufficient quality to observe image features of interest including the optic nerve head and the surrounding area.

The extraction module 125 may extract the optic nerve head region 130 from the image 110. After extraction of the optic nerve head region 130, the extracted image may be resampled to a square image with a size of 224×224 pixels. The resulting optic nerve head region 130 may be used as the input for the data augmenter module 140. In some embodiments, the optic nerve head region 130 is received by the system or the primary open-angle glaucoma likelihood estimator 105 without any need for extraction. In some embodiments, the image 110 is prepared beforehand to be the optic nerve head region 130 and does not require further image processing.

The optic nerve head region 130 is an image that includes the features of the optic nerve head. The optic nerve head region 130 may be received as image 110 or be the output image of the extraction module 125.

The data augmenter module 140 may apply a variation to the optic nerve head region 130 to produce a varied image 150. In some embodiments, the data augmenter module 140 performs a variation to each optic nerve head region 130. The variation may imitate a variation expected to occur biologically or as a result of imaging procedures or conditions. The variation may include noise representative of noise included in real-life data. Some variations—such as rotations, flipping, scaling, and intensity—may imitate a less-than-ideal image 110 or optic nerve head region 130. As a result, the convolutional neural network 160 is better trained for image 110 containing imperfections. In at least one embodiment, a horizontally mirrored version of the optic nerve head region 130 is generated to mimic right and left eye orientations. Variations may better train the convolutional neural network 160 to detect minor features that improve the overall predictability of primary open-angle glaucoma. These images may comprise the varied images 150.

The data augmenter module 140 may also use test time augmentation. Test time augmentation may take additional images used from a database to train the convolutional neural network 160 to generate additional varied images 150. The additional varied images may then undergo further modifications or variations before being passed to the convolutional neural network 160. This technique improves the robustness of the convolutional neural network 160.

In some embodiments, the data augmenter module 140 applies a first variation and a second variation to the optic nerve head region 130. The first variation and the second variation may include performing a horizontal translation, a vertical translation, a horizontal scaling, or a vertical scaling to the optic nerve head region 130. The first variation and the second variation may include performing a rotation, a color adjustment, a mirroring, or a nonlinear geometric transformation to the optic nerve head region 130. The data augmenter module 140 may apply multiplicative noise to the pixel values of the optic nerve head region 130, and apply additive noise to pixel values of the optic nerve head region 130.

The data augmenter module 140 may include a random variation generator 145. A set of parameters may control the degree or extent of the variations. The set of parameters may be chosen using a random procedure. In some embodiments, the first variation and the second variation to the optic nerve head region 130 are random variations. The first variation and the second variation may include performing a randomly selected horizontal translation, a randomly selected vertical translation, a randomly selected horizontal scaling, or a randomly selected vertical scaling to the optic nerve head region 130. The first variation and the second variation may include performing a randomly selected rotation, a randomly selected color adjustment, a randomly selected mirroring, or a randomly selected nonlinear geometric transformation to the optic nerve head region 130. The data augmenter module 140 may apply randomly selected multiplicative noise to the pixel values of the optic nerve head region 130, and apply randomly selected additive noise to pixel values of the optic nerve head region 130.

The convolutional neural network 160 may be a type of deep learning network, including computational units (neurons) organized into layers that are applied sequentially to process images. A neuron may be a simple computational unit. A neuron takes a set of inputs and generates an output based on an activation function. In some embodiments, the neuron combines all of its inputs and applies an application function to it and generates a single output.

In at least one embodiment, the layers are convolutional filters. Each of these layers includes a set of neurons that perform specific tasks that can be broadly categorized into several different types. Convolutional layers apply filters to images and generate response images. At the first layer, the optic nerve head region 130 may be analyzed, and the convolution layer may generate a set of separate images. Each succeeding layer may apply filters or convolutional kernels to generate additional response images. Each layer may map an area of the previous layer to a certain operation being performed. This process enables the convolutional neural network 160 to detect more and more complex features throughout the layers. The convolutional neural network 160 may make a final decision based on a final set of features or sets of fully connected neurons based on all of the regions within a particular image. Processing the convolutional layers better positions the convolutional neural network 160 to make a likelihood estimate for primary open-angle glaucoma. In at least one embodiment, each neuron in the fully connected layer looks at every part of the process images and combines those inputs to create a final convolutional layer. This final convolutional layer may be a fully connected layer used to determine an estimate of primary open-angle glaucoma.

The primary open-angle glaucoma likelihood output may depend on the learned weights that define the filters. A pooling layer may be used to summarize input by combining values across pre-defined regions. The pooling layer may produce a rescaled version of the input as an output. Fully connected layers resemble layers in traditional artificial neural networks and are used to compute the final output of the network. Distinct convolutional neural network 160 architectures may be defined by combining layers in various ways. Various embodiments of the convolutional neural network 160 may employ a unique architecture that has been trained to estimate primary open-angle glaucoma likelihoods.

The convolutional neural network 160 may be trained through exposure to image data with known disease states. This training performs an iterative optimization for selecting convolutional neural network weights that maximize the ability of the network to distinguish between healthy and diseased eyes. In some embodiments, the convolutional neural network 160 is trained using a database of known primary open-angle glaucoma diagnosis fundus images and healthy fundus images. After training, the convolutional neural network 160 can be applied to new fundus images to generate an estimate of primary open-angle glaucoma likelihood.

For each varied image 150, the convolutional neural network 160 may produce a quantitative value ranging from 0.0 (indicating very low likelihood of primary open-angle glaucoma) to 1.0 (indicating very high likelihood of primary open-angle glaucoma). In at least one embodiment, image 110 results in a set of quantitative estimates of primary open-angle glaucoma likelihoods. In some embodiments, a first primary open-angle glaucoma likelihood estimate based on the first varied optic nerve head region 130 may be generated using the trained convolutional neural network 160. A second primary open-angle glaucoma likelihood estimate based on the second varied optic nerve head region 130 may be generated using the trained convolutional neural network 160. In at least one embodiment, a set number of varied images inserted as input to the convolutional neural network 160 results in a set number of primary open-angle glaucoma likelihood estimates.

The estimate combiner 170 receives the quantitative values generated by the convolutional neural network 160 for each corresponding varied image. The estimate combiner 170 may combine these quantitative values to generate a single, final estimate of primary open-angle glaucoma likelihood. A first primary open-angle glaucoma likelihood estimate and the second primary open-angle glaucoma likelihood estimate may be combined into a final primary open-angle glaucoma likelihood estimate. The combining of the first primary open-angle glaucoma likelihood estimate and second primary open-angle glaucoma likelihood estimate into a final primary open-angle glaucoma likelihood estimate further comprises utilizing at least one of a mean, a median, a minimum, a maximum, and a linear combination.

In some embodiments, any appropriate function (e.g., arithmetic mean) may be selected to compute the final estimate 180. Appropriate functions may include a mean, a median, a minimum, a maximum, and a linear combination. A pre-selected preference or a learned weight may be associated with a function or a subset of quantitative values generated by the convolutional neural network 160. The first primary open-angle glaucoma likelihood estimate and second primary open-angle glaucoma likelihood estimate may be combined into a final primary open-angle glaucoma likelihood estimate further comprises utilizing at least one of a mean, a median, a minimum, a maximum, and a linear combination. The combination of first primary open-angle glaucoma likelihood estimate and second primary open-angle glaucoma likelihood estimate may include using the pre-selected preference or learned weights in calculating the mean, median, minimum, maximum, or linear combination.

The final estimate 180 represents a final primary open-angle glaucoma likelihood estimate based on an input image 110 as generated by the primary open-angle glaucoma likelihood estimator 105. The final primary open-angle glaucoma likelihood estimate may be presented to a user.

Figure 2:
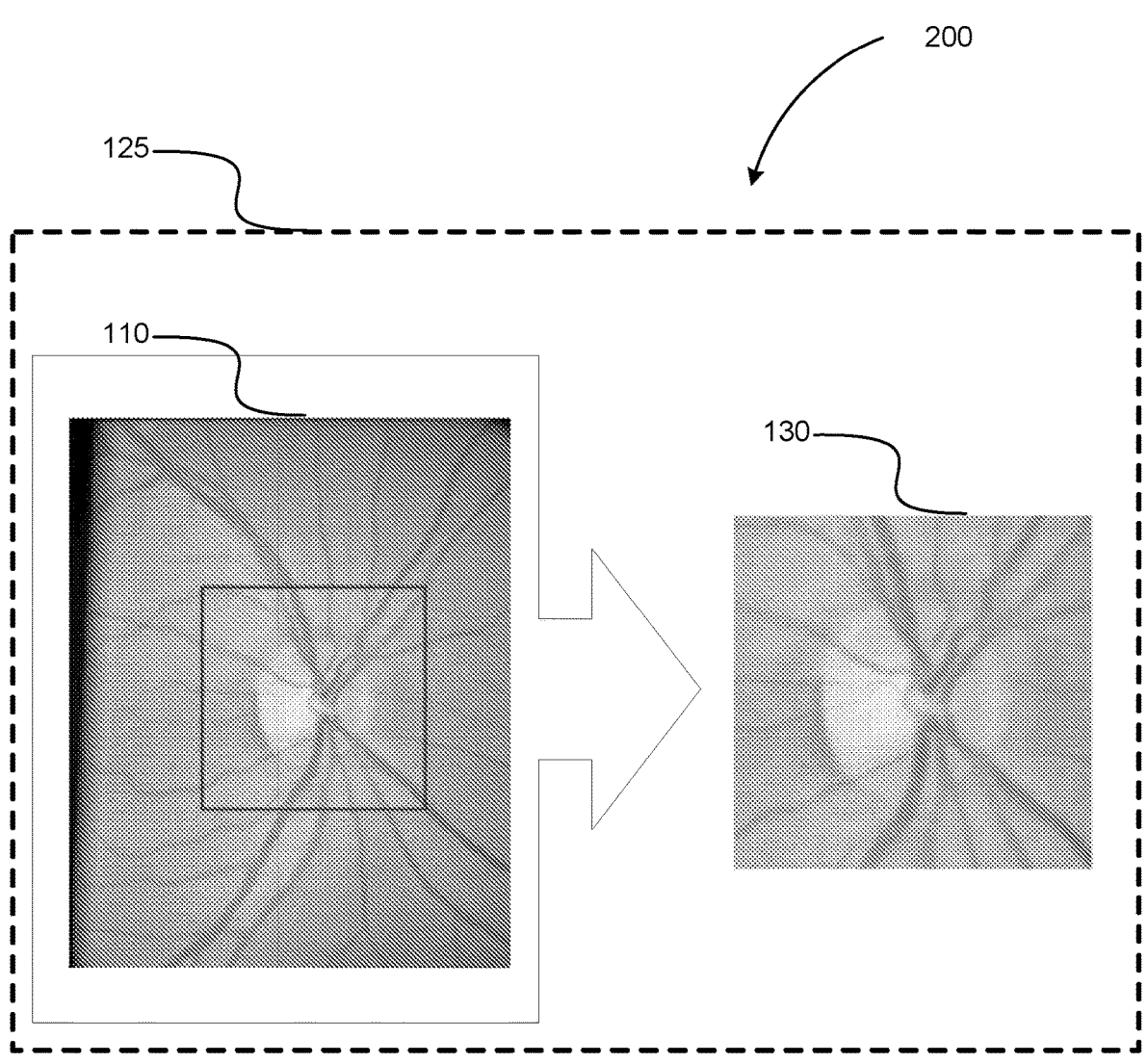
FIG. 2 shows an extraction module, in accordance with some example embodiments.

FIG. 2 shows an extraction module workflow 200, in accordance with some example embodiments. The extraction module 125 is presented with an input image 110 and extracts an image of the optic nerve head region 130 from the image. After extraction of the optic nerve head region 130, the extracted image may be resampled to a square image with a size of 224×224 pixels. The resulting optic nerve head region 130 may be used as the input for the data augmenter module 140. In some embodiments, the optic nerve head region 130 is received by the system or the primary open-angle glaucoma likelihood estimator 105 without any need for extraction. In some embodiments, the image 110 is prepared beforehand to be the optic nerve head region 130 and does not require further image processing.

Figure 3:
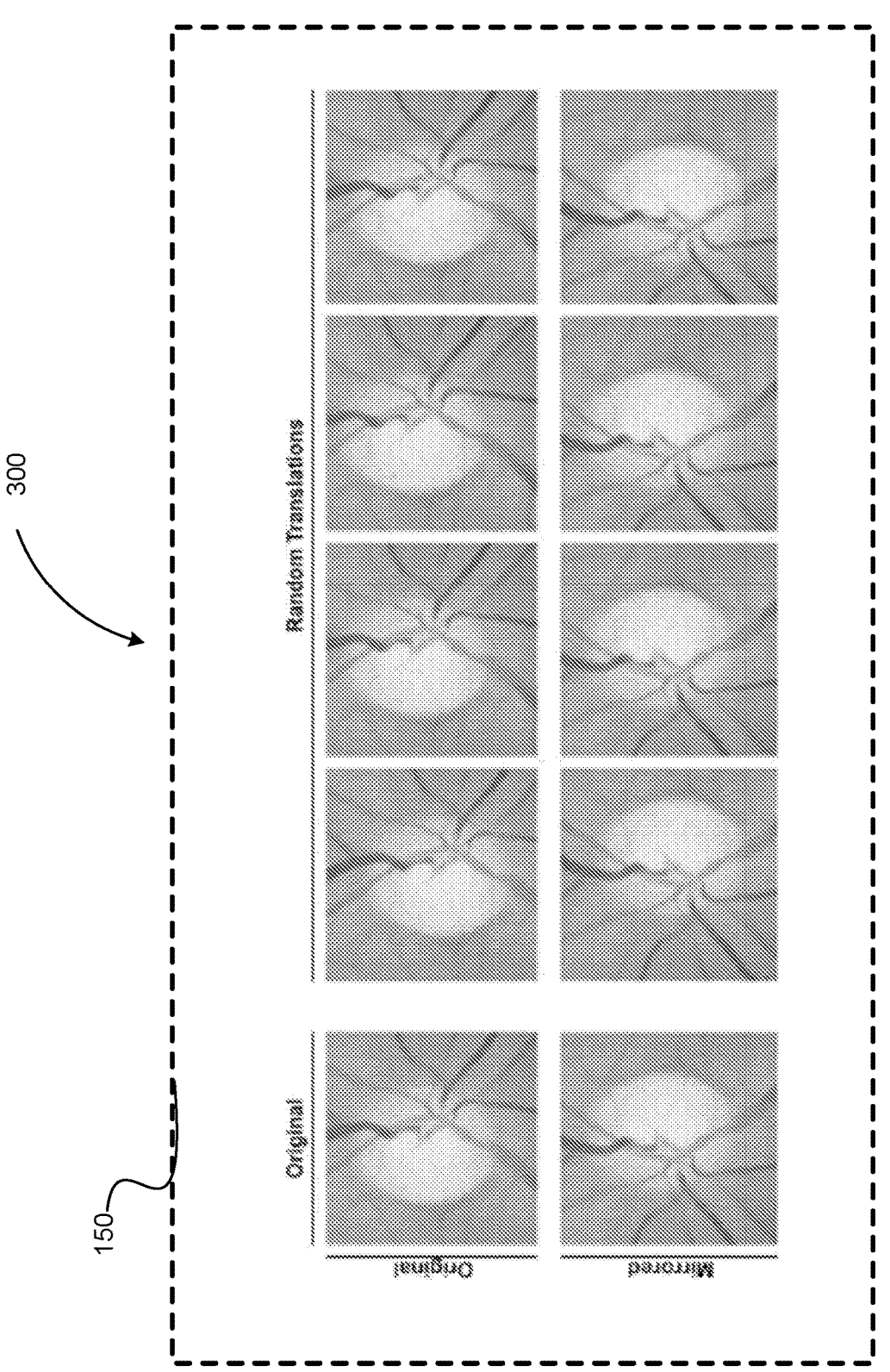
FIG. 3 shows image variations of the optic nerve head region resulting from the data augmentation process, in accordance with some example embodiments.

FIG. 3 shows an exemplary data augmentation output 300, including image variations as part of the of the optic nerve head region 130 resulting from the data augmentation process, in accordance with some example embodiments. A data augmentation procedure is applied to each optic nerve head region 130 to create a variation. Data augmentation is commonly used in training image classification tasks and can result in better performing, more generalizable models that are invariant to certain types of image transformations and variations in image quality.

The data augmenter module 140 may apply a variation to the optic nerve head region 130 to produce a varied image 150. In some embodiments, the data augmenter module 140 performs a variation to each optic nerve head region 130. The variation may imitate a variation expected to occur biologically or as a result of imaging procedures or conditions. The variation may include noise representative of noise included in real-life data. Some variations—such as rotations, flipping, scaling, and intensity—may imitate a less-than-ideal image 110 or optic nerve head region 130. As a result, the convolutional neural network 160 is better trained for image 110 containing imperfections. In at least one embodiment, a horizontally mirrored version of the optic nerve head region 130 is generated to mimic right and left eye orientations. Variations may better train the convolutional neural network 160 to detect minor features that improve the overall predictability of primary open-angle glaucoma. These images may comprise the varied images 150.

Figure 4:
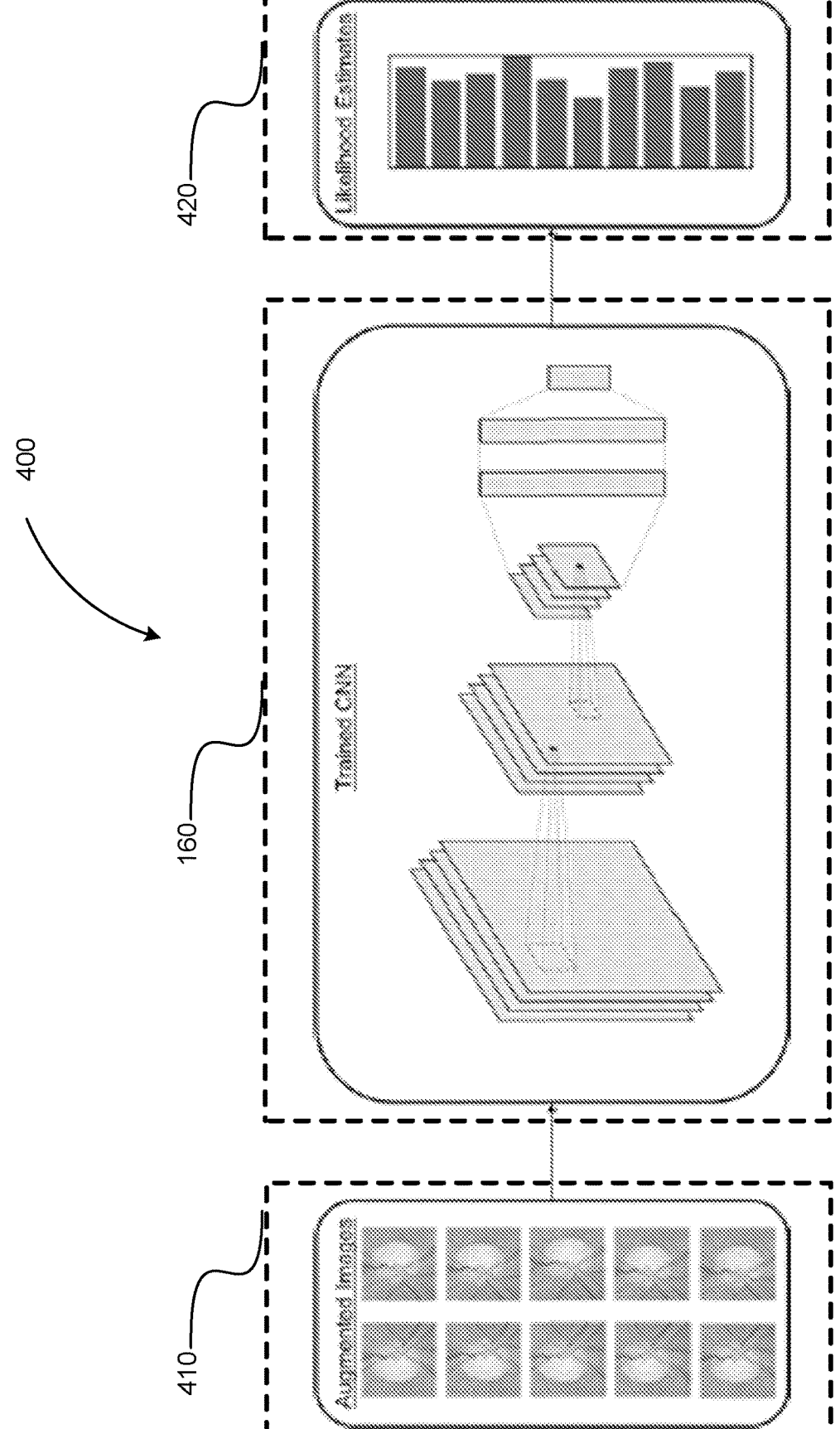
FIG. 4 shows a flowchart depicting the convolutional neural network generating likelihood estimates for various input images, in accordance with some example embodiments.

FIG. 4 shows a flowchart depicting the convolutional neural network workflow 400. The convolutional neural network workflow 400 generates likelihood estimates 420 for various input images, in accordance with some example embodiments.

FIG. 4 illustrates the process of applying a trained convolutional neural network to preprocessed and augmented optic nerve head images 410. The convolutional neural network 160 may be a type of deep learning network, including computational units (neurons) organized into layers that are applied sequentially to process images. A neuron may be a simple computational unit. A neuron takes a set of inputs and generates an output based on an activation function. In some embodiments, the neuron combines all of its inputs and applies an application function to it and generates a single output.

In at least one embodiment, the layers are convolutional filters. Each of these layers includes a set of neurons that perform specific tasks that can be broadly categorized into several different types. Convolutional layers apply filters to images and generate response images. At the first layer, the optic nerve head region 130 may be analyzed, and the convolution layer may generate a set of separate images. Each succeeding layer may apply filters or convolutional kernels to generate additional response images. Each layer may map an area of the previous layer to a certain operation being performed. This process enables the convolutional neural network 160 to detect more and more complex features throughout the layers. The convolutional neural network 160 may make a final decision based on a final set of features or sets of fully connected neurons based on all of the regions within a particular image. Processing the convolutional layers better positions the convolutional neural network 160 to make a likelihood estimate for primary open-angle glaucoma. In at least one embodiment, each neuron in the fully connected layer looks at every part of the process images and combines those inputs to create a final convolutional layer. This final convolutional layer may be a fully connected layer used to determine an estimate of primary open-angle glaucoma.

The primary open-angle glaucoma likelihood output may depend on the learned weights that define the filters. A pooling layer may be used to summarize input by combining values across pre-defined regions. The pooling layer may produce a rescaled version of the input as an output. Fully connected layers resemble layers in traditional artificial neural networks and are used to compute the final output of the network. Distinct convolutional neural network 160 architectures may be defined by combining layers in various ways. Various embodiments of the convolutional neural network 160 may employ a unique architecture that has been trained to estimate primary open-angle glaucoma likelihoods.

Figure 5:
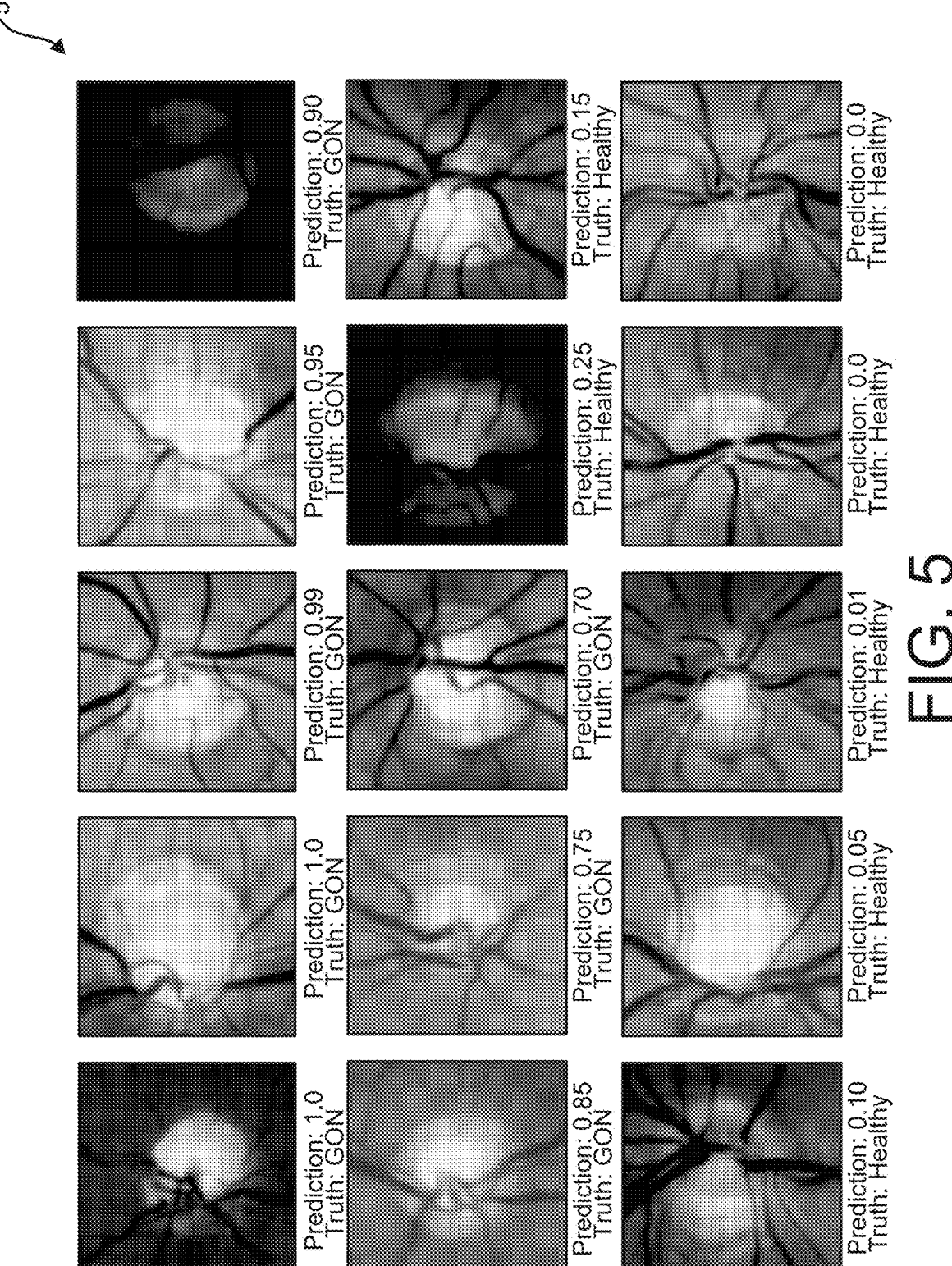
FIG. 5 shows exemplary outputs of primary open-angle glaucoma likelihood estimates for various input images, in accordance with some example embodiments.

FIG. 5 shows exemplary outputs 500 of primary open-angle glaucoma likelihood estimates for various input images, in accordance with some example embodiments.

Figure 6:
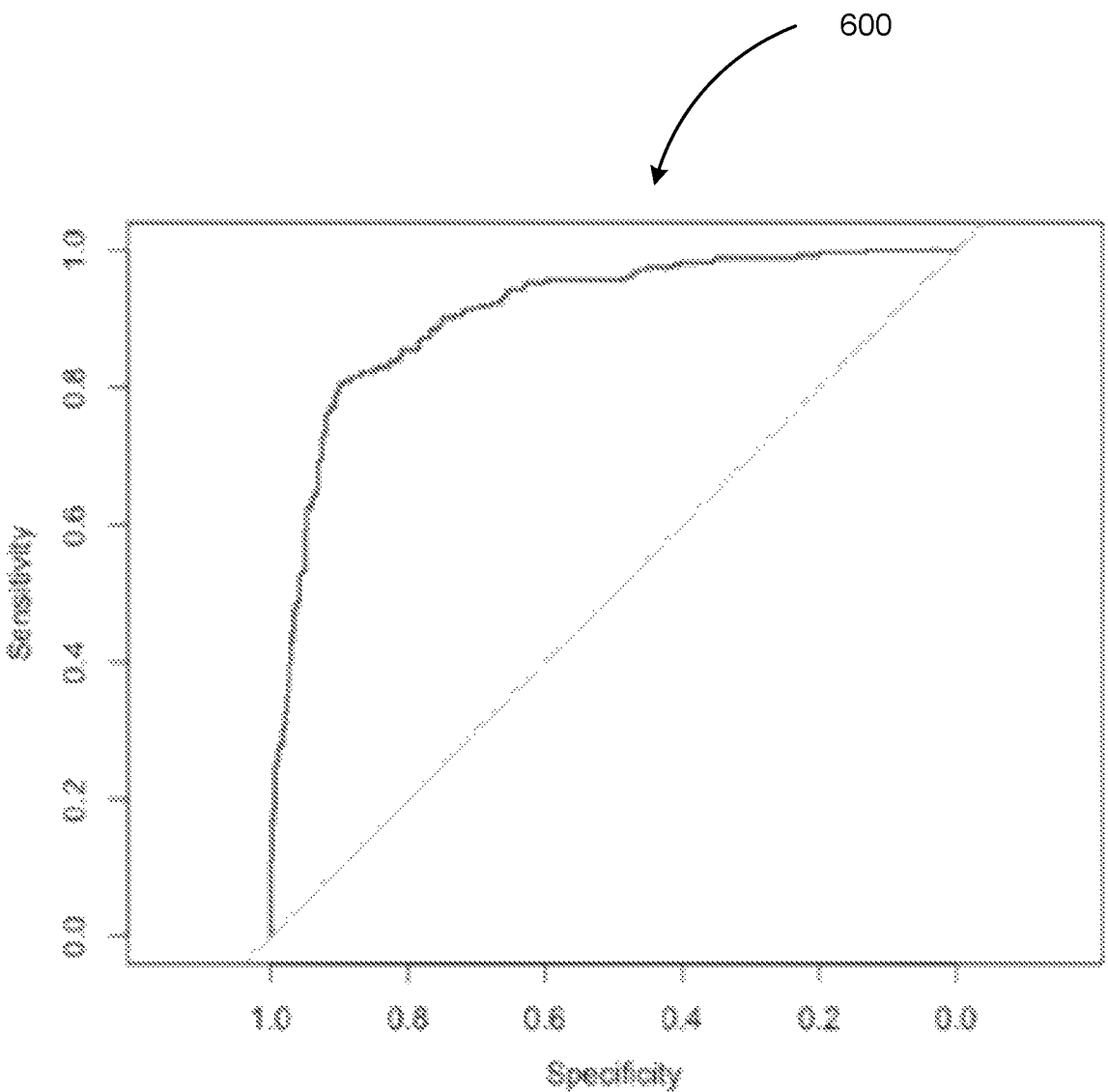
FIG. 6 shows an exemplary receiver operating characteristic (ROC) curve to characterize model performance based on sensitivity and specificity.

FIG. 6 shows an exemplary receiver operating characteristic (ROC) curve 600 to characterize model performance based on sensitivity and specificity. The performance of a convolutional neural network 160 is described here to show that it can achieve higher sensitivity, specificity, and accuracy than previously described systems for primary open-angle glaucoma detection. The convolutional neural network 160 achieved an area under ROC (AUC) of 0.91 in identifying primary open-angle glaucoma in fundus images. This outperforms previously published accuracies of glaucoma image processing systems. These included systems based on traditional image processing and machine learning classifiers as well as those that used deep learning approaches (AUCs in range of 0.80-0.89). The system had even higher performance (AUC of 0.97, sensitivity of 90% at 93% specificity) in identifying primary open-angle glaucoma from images of eyes with moderate-to-severe primary open-angle glaucoma.

The accuracy of the convolutional neural network 160 described here helps improve screening programs a viable option to improve disease detection and provide decision-making support for eye care providers. Previous work has shown that limited sensitivity and specificity of tests reduce the feasibility of screening programs given low overall disease prevalence. The accuracy of this convolutional neural network 160 suggests that it may be able to accurately identify primary open-angle glaucoma in specific screening situations while reducing the burden of false positives compared to other glaucoma-related measurements. Improved review of fundus photographs would also help reduce costs and aid in the implementation of large-scale screening programs by providing quick, objective, and consistent image assessment.

FIG. 7 depicts a flowchart illustrating a process for estimating primary open-angle glaucoma likelihood from fundus images, in accordance with some example embodiments.

At 702, the process receives an optic nerve head region of an original image. For example, the primary open angle glaucoma likelihood estimator 105 may receive an image from a server, an external drive, a database, or any other computing device. Alternatively, and/or additionally, image 110 may be provided by a camera communicatively coupled to the primary open-angle glaucoma likelihood estimator 105. The image 110 may be a fundus image.

At 704, the process applies a first variation to the optic nerve head region. For example, the data augmenter module 140 may apply a variation to the optic nerve head region 130 to produce a varied image 150. The variation may imitate a variation expected to occur biologically or as a result of imaging procedures or conditions.

At 706, the process applies a second variation to the optic nerve head region. For example, the data augmenter module 140 may apply a variation to the optic nerve head region 130 to produce a varied image 150. The variation may imitate a variation expected to occur biologically or as a result of imaging procedures or conditions.

At 708, the process generates, using a trained convolutional neural network, a first primary open angle glaucoma likelihood estimate based on the first varied optic nerve head region. For instance, the convolutional neural network 160 may produce a quantitative value ranging from 0.0 (indicating very low likelihood of primary open-angle glaucoma) to 1.0 (indicating very high likelihood of primary open-angle glaucoma) based on the first varied image 150.

At 710, the process may generate, using the trained convolutional neural network, a second primary open angle glaucoma likelihood estimate based on the second varied optic nerve head region. For instance, the convolutional neural network 160 may produce a quantitative value ranging from 0.0 (indicating very low likelihood of primary open-angle glaucoma) to 1.0 (indicating very high likelihood of primary open-angle glaucoma) based on the second varied image 150.

At 712, the process combines the first primary open angle glaucoma likelihood estimate and the second primary open angle glaucoma likelihood estimate into a final primary open angle glaucoma likelihood estimate. For example, the estimate combiner 170 receives the quantitative values generated by the convolutional neural network 160 for each corresponding varied image (e.g., the first varied image 150 and the second varied image 150). The estimate combiner 170 may combine these quantitative values to generate a single, final estimate (e.g., final estimate 180) of primary open-angle glaucoma likelihood.

At 714, the process presents the final primary open angle glaucoma likelihood estimate to a user. For example, the final estimate 180 may be presented to a user through graphical information on a user interface on a display device.

Figure 8:
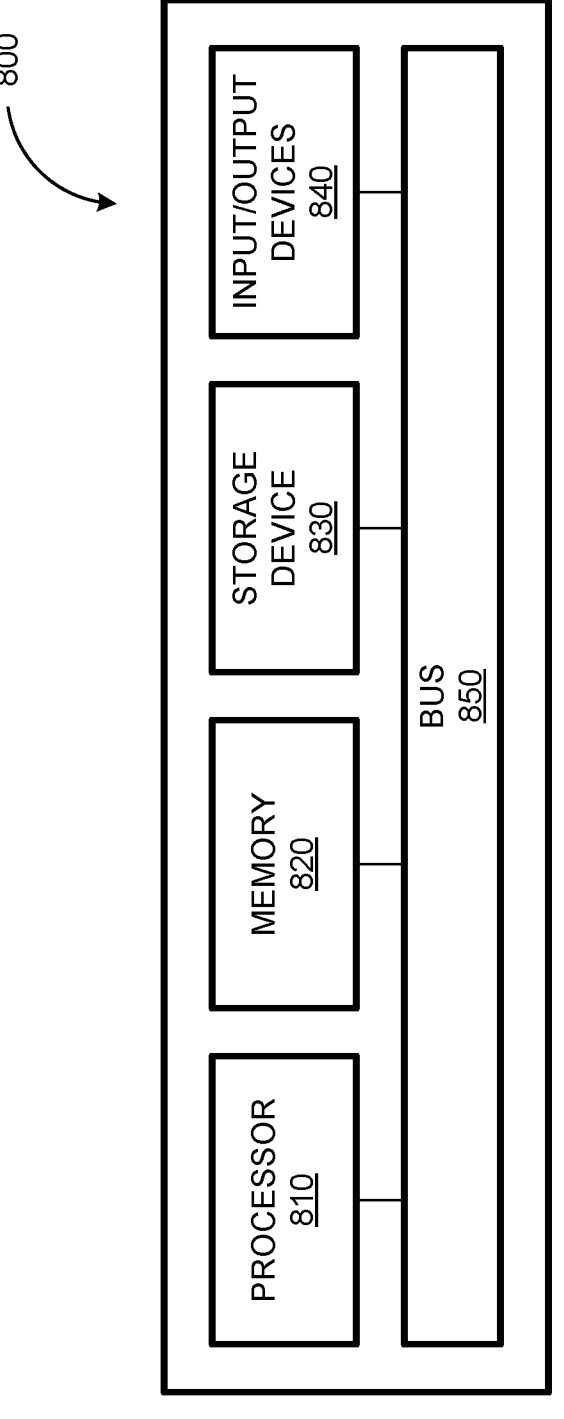
FIG. 8 depicts a block diagram illustrating a computing system, in accordance with some example embodiment.

FIG. 8 depicts a block diagram illustrating a computing system 800 consistent with implementations of the current subject matter. The computing system 800 may be used to host the estimator 105 disclosed herein. As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the block diagram 100 or method 700. In some implementations, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840, such as a screen, keyboard, and/or other input/output devices.

The memory 820 is a computer-readable medium such as volatile or non-volatile that stores information within the computing system 800. The memory 820 can store instructions and/or other data associated with the processes disclosed herein. The storage device 830 is capable of providing persistent storage for the computing system 800. The storage device 830 can be a floppy disk device, a hard disk device, an optical disk device, a tape device, or other suitable persistent storage means. The input/output device 840 provides input/output operations for the computing system 800. In some example embodiments, the input/output device 840 includes a keyboard and/or pointing device. In various implementations, the input/output device 840 includes a display unit for displaying graphical user interfaces.

According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example embodiments, the computing system 800 can be used to execute various interactive computer software applications that can be used for organization, analysis, and/or storage of data in various formats. Alternatively, the computing system 800 can be used to execute any type of software applications.

Figure 9:
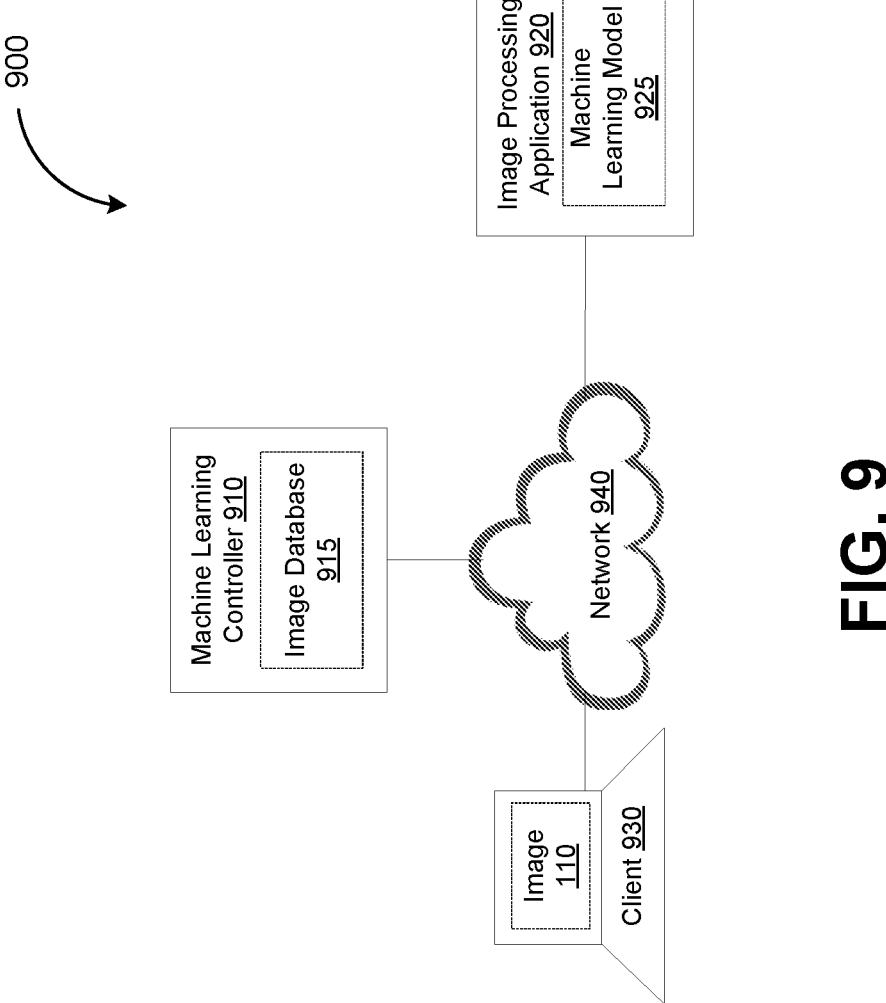
FIG. 9 depicts a system diagram illustrating an example of a machine learning processing system 900, in accordance with some example embodiments.

FIG. 9 depicts a system diagram illustrating an example of a machine learning processing system 900, in accordance with some example embodiments. The convolutional neural network 160 may be trained in a manner similar to a machine learning processing system 900. The convolutional neural network 160 may communicate with devices over a network similar to or as depicted in the machine learning processing system 900. Referring to FIG. 9, the machine learning processing system 900 may include a machine learning controller 910, an image processing application 920, and a client 930. The machine learning controller 910, the image processing application 920, and the client 930 may be communicatively coupled via a network 940. It should be appreciated that the client 930 may be any processor-based device including, for example, a smartphone, a tablet computer, a wearable apparatus, a virtual assistant, an Internet-of-Things (IoT) appliance, and/or the like. The network 940 may be any wired network and/or a wireless network including, for example, a wide area network, a local area network, a virtual local area network, a public land mobile network, the Internet, and/or the like.

In some example embodiments, the machine learning controller 910 may be configured to generate an image database 915 for training and validating a machine learning model 925 to perform image processing including by classify an image 110 received from the client 930. The machine learning model 925 may be any type of machine learning model including, for example, a neural network, a convolutional neural network, a Markov chain, a support vector machine, a Bayesian network, and/or the like. The image database 915 may include a training dataset for training the machine learning model 925 as well as a validation dataset for validating a performance of the machine learning model 925.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

In the following description, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

What is claimed is:

1. A system comprising:
   at least one processor; and
   at least one memory storing instructions which, when executed by the at least one processor, cause operations comprising:
      training a convolutional neural network with a plurality of varied images to generate a trained convolutional neural network able to detect minor features that improve a predictability of estimating primary open angle glaucoma likelihoods, wherein the training performs an iterative optimization for selecting convolutional neural network weights that optimizes an ability of the trained convolutional neural network to distinguish between healthy and diseased eyes;

receiving an optic nerve head region of an original image;

applying a first variation to the optic nerve head region, wherein the first variation comprises a horizontally mirrored version of the optic nerve head region to imitate a variation expected to occur biologically;

applying a second variation to the optic nerve head region, wherein the second variation comprises noise, a rotation, a color adjustment, and/or a non-linear geometric transformation;

generating, using the trained convolutional neural network and based at least on part on the first variation and the second variation, a first primary open angle glaucoma likelihood estimate based on the first varied optic nerve head region;

generating, using the trained convolutional neural network and based at least on part on the first variation and the second variation, a second primary open angle glaucoma likelihood estimate based on the second varied optic nerve head region;

combining, into a final primary open angle glaucoma likelihood estimate, the first primary open angle glaucoma likelihood estimate and the second primary open angle glaucoma likelihood estimate by calculating a combination of the first primary open angle glaucoma likelihood estimate and the second primary open angle glaucoma likelihood estimate using learned weights, wherein the learned weights are associated with a subset of quantitative values generated by the trained convolutional neural network; and presenting the final primary open angle glaucoma likelihood estimate on a user interface on a display device.

2. The system of claim 1, wherein the original image is a fundus image and the optic nerve head region is centered on an optic nerve head.

3. The system of claim 1, further comprising:
   identifying the optic nerve head region of the original image; and extracting
   the optic nerve head region.

4. The system of claim 1, wherein the first variation is a randomly selected color adjustment optic nerve head region has a shape of a square.

5. The system of claim 1, wherein the first variation is a variation in intensity of pixel values of the optic nerve head region further comprising:
   verifying the original image meets a quality standard.

6. The system of claim 1, wherein the first variation is a random variation.

7. The system of claim 1, wherein the first primary open angle glaucoma likelihood estimate and the second primary open angle glaucoma likelihood estimate are combined into the final primary open angle glaucoma likelihood estimate by calculating a linear combination of the first primary open angle glaucoma likelihood estimate and the second primary open angle glaucoma likelihood estimate using the learned weights trained convolutional neural network is trained using a database of known primary open angle glaucoma diagnosis fundus images and healthy fundus images.

8. The system of claim 1, wherein a set of parameters controlling variations are chosen using a random procedure.

9. The system of claim 1, wherein the second variation includes performing at least one of a nonlinear geometric transformation, multiplicative noise applied to pixel values of the optic nerve head region, and an additive noise applied to the pixel values of the optic nerve head region.

10. A method comprising:

training a convolutional neural network with a plurality of varied images to generate a trained convolutional neural network able to detect minor features that improve a predictability of estimating primary open angle glaucoma likelihoods, wherein the training performs an iterative optimization for selecting convolutional neural network weights that optimizes an ability of the trained convolutional neural network to distinguish between healthy and diseased eyes;

receiving an optic nerve head region of an original image;

applying a first variation to the optic nerve head region, wherein the first variation comprises a horizontally mirrored version of the optic nerve head region to imitate a variation expected to occur biologically;

applying a second variation to the optic nerve head region, wherein the second variation comprises noise, a rotation, a color adjustment, and/or a nonlinear geometric transformation;

generating, using the trained convolutional neural network and based at least on part on the first variation and the second variation, a first primary open angle glaucoma likelihood estimate based on the first varied optic nerve head region;

generating, using the trained convolutional neural network and based at least on part on the first variation and the second variation, a second primary open angle glaucoma likelihood estimate based on the second varied optic nerve head region;

combining, into a final primary open angle glaucoma likelihood estimate, the first primary open angle glaucoma likelihood estimate and the second primary open angle glaucoma likelihood estimate by calculating a combination of the first primary open angle glaucoma likelihood estimate and the second primary open angle glaucoma likelihood estimate using learned weights, wherein the learned weights are associated with a subset of quantitative values generated by the trained convolutional neural network; and presenting the final primary open angle glaucoma likelihood estimate on a user interface on a display device.

11. The method of claim 10, wherein the original image is a fundus image and the optic nerve head region is centered on an optic nerve head.

12. The method of claim 10, further comprising:

identifying the optic nerve head region of the original image; and extracting the optic nerve head region.

13. The method of claim 10, wherein the first variation is a randomly selected color adjustment optic nerve head region has a shape of a square.

14. The method of claim 10, wherein the first variation is a variation in intensity of pixel values of the optic nerve head region further comprising:

verifying the original image meets a quality standard.

15. The method of claim 12, wherein the first variation is a random variation.

16. The method of claim 12, wherein the first primary open angle glaucoma likelihood estimate and the second primary open angle glaucoma likelihood estimate are combined into the final primary open angle glaucoma likelihood estimate by calculating a linear combination of the first primary open angle glaucoma likelihood estimate and the second primary open angle glaucoma likelihood estimate using the learned weights trained convolutional neural network is trained using a database of known primary open angle glaucoma diagnosis fundus images and healthy fundus images.

17. The method of claim 10, wherein the second variation includes performing at least one of a nonlinear geometric transformation, multiplicative noise applied to pixel values of the optic nerve head region, and an additive noise applied to the pixel values of the optic nerve head region.

18. A non-transitory computer-readable medium comprising instructions which, when executed by at least one processor, cause operations comprising:

training a convolutional neural network with a plurality of varied images to generate a trained convolutional neural network able to detect minor features that improve a predictability of estimating primary open angle glaucoma likelihoods, wherein the training performs an iterative optimization for selecting convolutional neural network weights that optimizes an ability of the trained convolutional neural network to distinguish between healthy and diseased eyes;

receiving an optic nerve head region of an original image;

applying a first variation to the optic nerve head region, wherein the first variation comprises a horizontally mirrored version of the optic nerve head region to imitate a variation expected to occur biologically;

applying a second variation to the optic nerve head region, wherein the second variation comprises noise, a rotation, a color adjustment, and/or a nonlinear geometric transformation;

generating, using the trained convolutional neural network and based at least on part on the first variation and the second variation, a first primary open angle glaucoma likelihood estimate based on the first varied optic nerve head region;

generating, using the trained convolutional neural network and based at least on part on the first variation and the second variation, a second primary open angle glaucoma likelihood estimate based on the second varied optic nerve head region;

combining, into a final primary open angle glaucoma likelihood estimate, the first primary open angle glaucoma likelihood estimate and the second primary open angle glaucoma likelihood estimate by calculating a combination of the first primary open angle glaucoma likelihood estimate and the second primary open angle glaucoma likelihood estimate using learned weights, wherein the learned weights are associated with a subset of quantitative values generated by the trained convolutional neural network; and presenting the final primary open angle glaucoma likelihood estimate on a user interface on a display device.

* * * * *